United States Patent [19]
Keene

[11] Patent Number: 6,092,085
[45] Date of Patent: Jul. 18, 2000

[54] METHOD AND SYSTEM FOR IMPROVED DATABASE DISASTER RECOVERY

[75] Inventor: William Norman Keene, Dallas, Tex.

[73] Assignee: International Business Machines Corporation, Armonk, N.Y.

[21] Appl. No.: 09/047,058

[22] Filed: Mar. 24, 1998

[51] Int. Cl.[7] .................................................. G06F 17/30
[52] U.S. Cl. ............................................................ 707/202
[58] Field of Search ...................................... 707/202, 201, 707/203, 8; 714/11; 709/106, 107

[56] References Cited

U.S. PATENT DOCUMENTS

| | | | |
|---|---|---|---|
| 5,280,611 | 1/1994 | Mohan et al. ............................... | 707/8 |
| 5,287,496 | 2/1994 | Chen et al. ................................ | 707/203 |
| 5,414,840 | 5/1995 | Rengarajan et al. ..................... | 707/201 |
| 5,561,798 | 10/1996 | Haderle et al. .......................... | 707/202 |
| 5,870,763 | 2/1999 | Lomet ...................................... | 707/202 |
| 5,933,838 | 8/1999 | Lomet ...................................... | 707/202 |
| 5,946,698 | 8/1999 | Lomet ...................................... | 707/202 |

*Primary Examiner*—Hosain T. Alam
*Assistant Examiner*—Sanjiv Shah
*Attorney, Agent, or Firm*—Sawyer Law Group LLP; Ray Strimiatis

[57] ABSTRACT

A database recovery approach is disclosed that eliminates the need to establish IMS recovery points for disaster recovery or potential time stamp recovery purposes. The need to quiesce databases is thus removed, and IMS databases are able to be recovered at any time without requiring the existence of an IMS recovery point. Further, disaster recovery service restoration times are reduced by automatically performing all necessary RECON maintenance operations. Additionally, IMS disaster recovery methodologies are allowed where archived IMS log data is manually shipped off-site to continue to allow work in an IMS data sharing environment.

10 Claims, 3 Drawing Sheets

METHOD AND SYSTEM FOR IMPROVED DATABASE DISASTER RECOVERY

FIELD OF THE INVENTION

The present invention relates to database recovery techniques and more particularly to recovery of IMS (information management system) databases with or without block level data sharing in both a local and disaster recovery environment.

BACKGROUND OF THE INVENTION

With the popularity and convenience of networking computer systems, data sharing among users through databases has become common in many business environments. Providing central access to information via databases requires careful consideration of database maintenance and management. Further, recovery techniques are essential in ensuring database coherence following a hardware/device failure or application logic failure.

In general, recovery techniques associated with database recovery reset a system or data stored in a system to an operable state following damage and provide a process of rebuilding databases by restoring a backup copy and rolling forward the logs associated with the backup copy. Included in the techniques are static recovery point, incremental recovery point, and continuous recovery point. Time stamp recovery is another recovery technique typically performed for application logic failures, rather than device failures. While providing disaster recovery, these techniques unfortunately do not provide some preferred results.

In static recovery point, a straightforward backup methodology is utilized. A user quiesces/halts all of the database activity and then image copies all of the databases to be sent off-site with a back-up of a RECON (recovery control) data set. The disaster recovery process then involves performing moderate RECON cleanup operations, recovering the databases using standard database recovery control (DBRC) supported commands, and resumption of database processing. While being low cost and simple, several drawbacks exist in the static recovery point technique. Firstly, the technique requires a data outage, i.e., all database access must be terminated when establishing the static recovery point. The outage could vary from tens of minutes to hours (if image copies are taken). Further, since the impact of data outages results in infrequent static recovery points, there is a maximum data loss, which may lead to up to a day's worth of work or more of data updates being lost in the event of a disaster. Additionally, moderate RECON clean-up operations are required, for example marking primary logs and image copies in error so that secondary copies would be selected by DBRC during recovery operations, as is standardly known.

In incremental recovery point, image copies, logs, and periodic RECON backups are sent off-site as they become available with the actual transport varying as needed for a particular enterprise. The disaster recovery process includes determining the latest available logs and RECON backup, performing major RECON cleanup operations, recovering the databases using standard DBRC supported techniques, identifying and performing any needed database backout operations, and resuming processing. Advantageously, no data outage occurs for the incremental recovery point technique, and the technique is relatively low cost. However, there is medium data loss, with a minimum amount of data loss up to an OLDS' (on-line log data set) worth of data, e.g. up to hours worth of data updates, since the online log data is unavailable until it is archived. Further, moderate complexity during disaster recovery is needed due to the database recovery operations followed by database backout operations, which are generally considered complicated, error prone operations. Additionally, incremental point recovery does not work well with data sharing environment's, such as IBM's IMS (information management system), since multiple, independent IMS log data are produced in an IMS data sharing environment, and there are no IMS utilities to handle such log data streams.

As its name implies, the continuous recovery point technique continually sends log data and RECON data off-site, (i.e., electronic log vaulting) with image copies sent off-site as they occur. For example, IBM's IMS/ESA Remote Site Recovery (RSR) feature environment is a continuous recovery point technique. The disaster recovery process involves performing an RSR takeover, recovering the databases using standard DBRC supported techniques, and performing any required backout operations. The continuous recovery technique avoids some of the problems mentioned for other recovery techniques by providing minimal data loss, working with IMS data sharing, and potentially reducing disaster recovery outage to single digit minutes with the RSR user option of shadow databases continuously maintained off-site. Unfortunately, while achieving some benefits, significant resource expense is required in order to provide continuous recovery point recovery. In addition to the costs for communications facilities between the primary data processing location and the off-site facility, there must also be an IMS tracking system executing at the off-site location to continuously receive the log data. Further, if shadow databases are utilized, additional cost is incurred due to the necessity of dedicated DASD at the off-site facility.

For time stamp recovery, recovery of a database occurs to some earlier state, for example, from the state at 4:00 PM to the state it was in at 2:00 PM. Of course, all updates between the current state and the state to which the database is recovered are lost, thus making time stamp recovery preferably avoided if possible. When time stamp recovery is the only viable option, however, the normal IMS rules dictate that the time stamp selected must be a time when update activity against the database was quiesced, i.e., to a recovery point, normally established by issuing database recovery commands (e.g., /DBR or /DBD commands) from all of the IMS subsystems currently accessing the database. Once the commands are successfully completed on all of the IMS subsystems, the databases can usually be restarted. The span of the resulting recovery point is from the completion of the last recovery (/DBR or /DBD) command to the issuance of the first start (e.g., /STA) command. For databases participating in data sharing, an OLDS switch has to occur in-between these commands on each IMS subsystem. The main disadvantages of the time stamp recovery technique are that the creation of recovery points results in a temporary data outage, and that a recovery point has to exist prior to the need for one, which usually results in not having one when needed.

Accordingly, several needs exist for a method and system that overcome the disadvantages of typical database recovery techniques. A further need exists in allowing an IMS database to be recovered to a state that is consistent with any associated relational database (e.g., DB2) tables.

SUMMARY OF THE INVENTION

The present invention meets these needs through method and system aspects of improved database recovery. An exemplary aspect includes preparation of a set of information management system (IMS) logs and recovery control (RECON) data sets for database recovery to any desired recovery time, and utilization of existing database tools to implement recovery of the database to the desired recovery time. Further included is analysis of control statement inputs to determine options for conditioning the input and output data sets for recovery, including the desired recovery time, a determination of open batch logs, archiving gaps, and logs created by a batch backout utility from a recovery control data set, a determination of a latest valid recovery time from the recovery control data set, and validation of the desired recovery time in correspondence with the latest valid recovery time. Additionally included is a determination of active log data sets in log data streams during the desired recovery time, creation of a first plurality of threads to analyze contents of log data sets from multiple and concurrent log data streams and to copy the contents to intermediate files, and revalidation and adjustment of the desired recovery time based on the log data streams.

Creation of a second plurality of threads to dynamically allocate output log data sets, copy log data from the intermediate files to the output log data sets, truncate the copied log data at the desired recovery time, and analyze the copied log data to determine in-flight and in-doubt units of recovery is also included along with a reporting of in-flight and in-doubt units of recovery. Further included is processing of the recovery control data set to adjust logging records to reflect the output log data sets, adjust data records to give the appearance that activity ceased at the desired recovery time, mark a need for database recovery, close logging records, build backout records for in-flight and in-doubt units of recovery, and mark databases affected by in-flight and in-doubt units of recovery as needing backout.

With the present invention, improved IMS data availability is effectively achieved by eliminating the need to establish IMS recovery points for disaster recovery or potential time stamp recovery purposes. Thus, the need to quiesce databases is removed, and IMS databases are able to be recovered at any time without requiring the existence of an IMS recovery point. Further, disaster recovery service restoration times are reduced by automatically performing all necessary RECON maintenance operations. Additionally, IMS disaster recovery methodologies are allowed where archived IMS log data is manually shipped off-site to continue to allow work in an IMS data sharing environment. Also, coordinated disaster recovery between IMS databases and DB2 objects is capable without requiring that both database management systems be quiesced. These and other advantages of the aspects of the present invention will be more fully understood in conjunction with the following detailed description and accompanying drawings.

DETAILED DESCRIPTION

The present invention relates to improved database recovery techniques. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
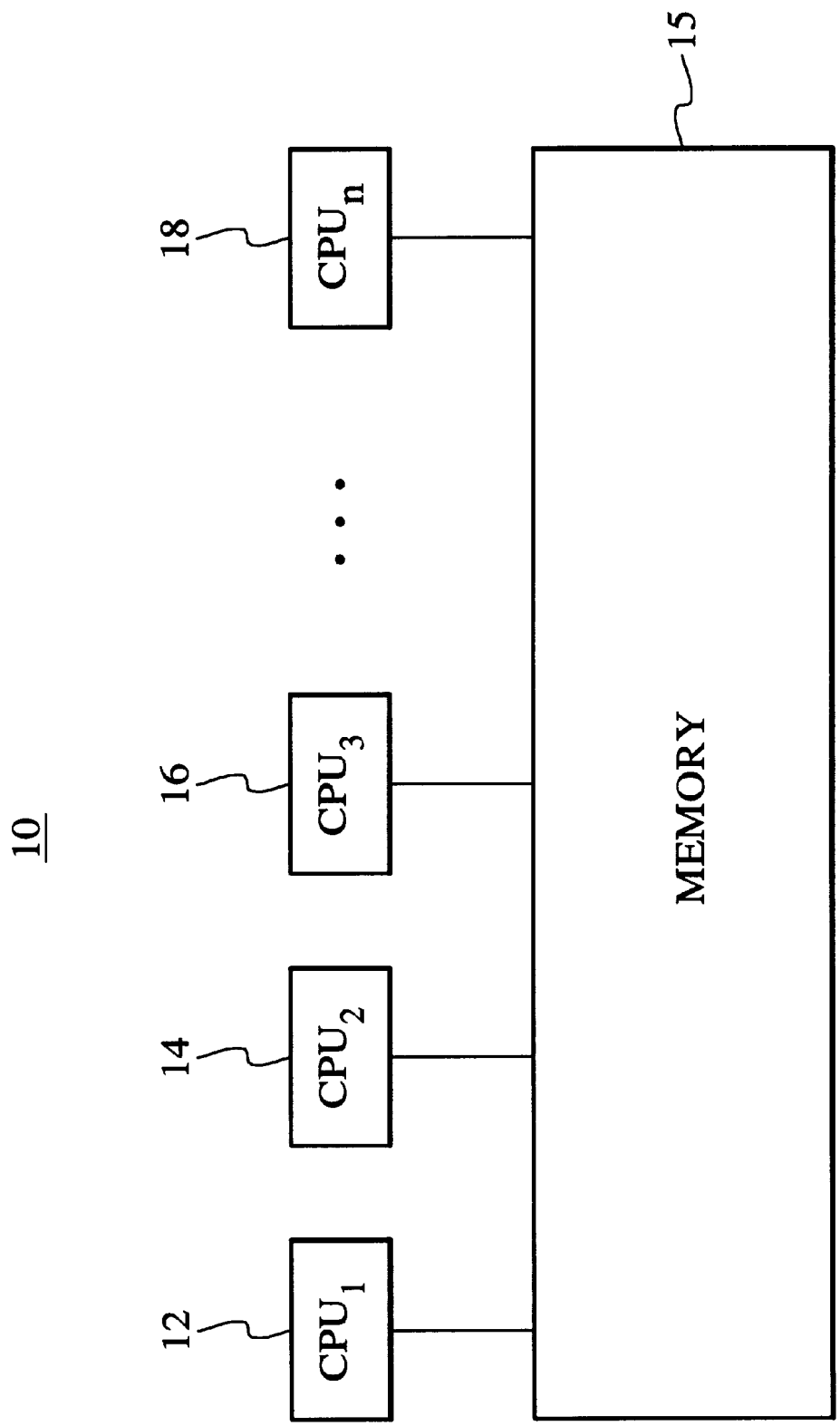
FIG. 1 illustrates a block diagram of a data processing system in accordance with a preferred embodiment.

FIG. 1 illustrates a block diagram of a data processing system 10. The data processing system 10 comprises a plurality of multitasking devices, CPUs 12, 14, 16, and 18, respectively, such as IBM System/390s operating under the IBM MVS/ESA (Multiple Virtual Storage/Enterprise Systems Architecture) operating system, available from IBM, Corporation, Armonk, N.Y. The CPUs 12–18 suitably operate together in concert with memory 15 in order to execute a variety of tasks. Of course, other components may be utilized with data processing system 10, for example, input/output devices, such as DASDs, printers, tapes, etc. Further, although the present invention is described in a particular hardware environment, those skilled in the art will recognize and appreciate that this is meant to be illustrative and not restrictive of the present invention. Accordingly, other alternative hardware environments may be used without departing from the scope of the present invention.

Functionality capable of being provided under the MVS/ESA operating system includes hierarchical database management services, IMS. One of the tasks that the operating system undertakes is the recovery to a prior state of IMS databases with or without IMS data sharing. Another task is the recovery of IMS databases at a disaster recovery site from archived logs and image copies that had been transported to the disaster recovery site.

Figure 2:
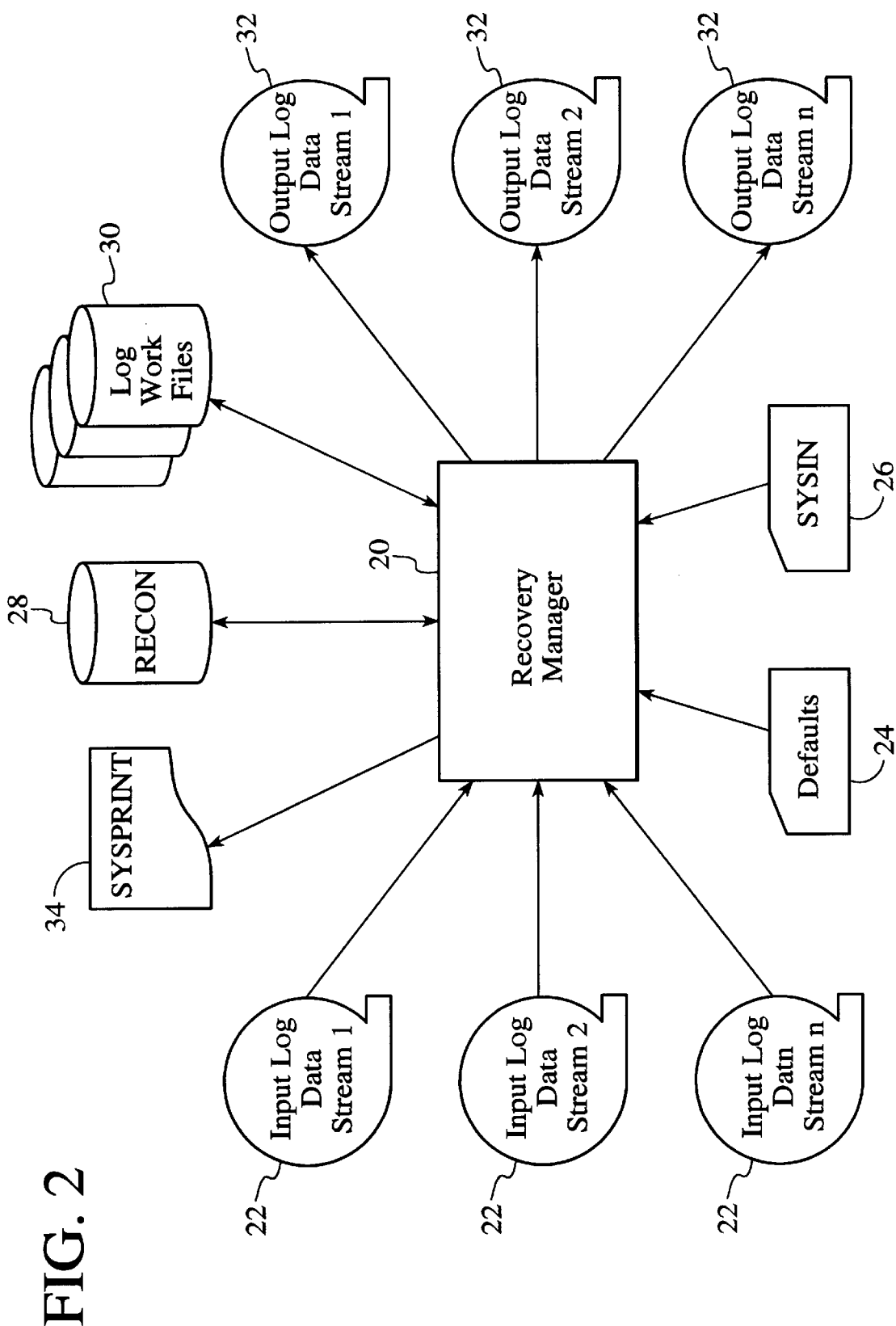
FIG. 2 illustrates a recovery manager and input and output data sets in accordance with a preferred embodiment.

Through the present invention, preparation and conditioning of a set of IMS logs and RECON data sets suitably occur to achieve these tasks via a recovery manager 20, illustrated in FIG. 2. FIG. 2 also illustrates the input and output data sets, including input log data streams 22, defaults 24, system input streams (SYSIN) 26, RECON data sets 28, log work files 30, output data streams 32, and system output streams (SYSPRINT) 34, that are input to or output from the recovery manager 20 in accordance with the present invention. Through the recovery manager 20, recovery of databases participating in data sharing and recovery to any desired recovery point is capably achieved. The recovery manager 20 of the present invention is generally implemented by one or more computer programs stored in memory and under control of the operating system which cause the data processing system 10 to perform the desired functions, as described herein. Alternatively, the present invention may be suitably implemented by the operating system itself.

Figure 3:
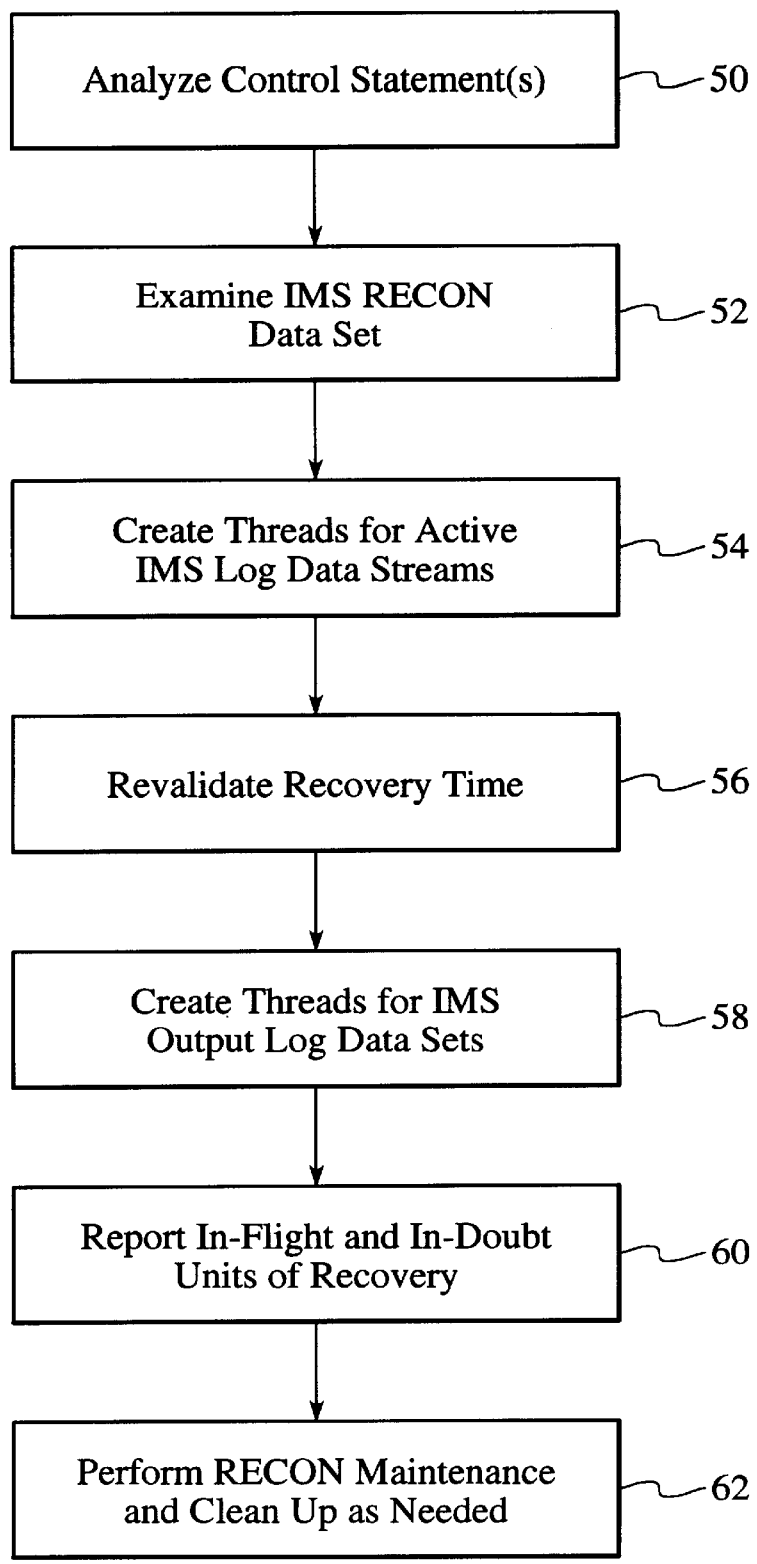
FIG. 3 illustrates a block flow diagram of the functionality achieved via the recovery manager of FIG. 2.

FIG. 3 illustrates a block flow diagram of the recovery functionality achieved via the recovery manager 20. The processing initiates with analysis of control statement input in order to determine the options to be used when conditioning the IMS logs and RECON data sets (step 50). Suitably, analysis involves reading and processing control statements, including what actual recovery time, i.e., cut-off time or truncation time, is desired. Continuing with the processing (step 52), an IMS RECON data set is examined to determine all open IMS batch logs, all IMS archiving gaps, and all IMS logs created by an IMS batch backout utility. The IMS RECON data set is further processed to determine a latest valid recovery time stamp and to validate the user supplied recovery time (indicated from analysis step 50). The processing of the IMS RECON data set further includes determining which IMS log data sets within which IMS log data streams (e.g., streams 22, FIG. 2) were active during the recovery time. Of course, the log truncation time may be affected by this determination in that truncation cannot occur past the start of one of the times of an open batch log, archiving gap, or log created by the IMS batch backout utility.

A set of software threads is then created (step 54) (one per active IMS log data stream) that analyzes the contents of the selected log data sets from each active IMS log data stream and copies them to intermediate/work files (30, FIG. 2), i.e., attaching multiple tasks and then copying them to work files. What is meant by thread for the purposes of this discussion is a dispatchable unit of work that is recognized by the operating system. The recovery time is then suitably revalidated based on log data set contents (step 56). Thus, the information in the log data sets utilized in step 52 reflects the opening and closing time of those sets, which may not necessarily be exactly the same as the earliest or latest time stamp in the log records used to revalidate the recovery time.

Once the recovery time is revalidated, a set of software threads is created, one thread per active IMS log data stream, that preferably create/dynamically allocate IMS output log data sets (step 58). The IMS log data from the work files of step 54 is suitably copied to the IMS output log data sets with the IMS log data sets truncated at the recovery time. The copied IMS log data is further preferably analyzed to determine all in-flight and in-doubt IMS units of recovery. Thus, utilizing the determined recovery time, the input logs are copied to work files, and the work files are copied to output data sets with the copying stopped at the designated recovery time. A report is then made (step 60) of all IMS units of recovery that were in-flight or in-doubt at the output log truncation point for each active IMS log data stream, as determined internally during step 58.

The process finishes (step 62) with performance of all necessary RECON maintenance or cleanup operations in a manner such that it appears that no IMS activity has occurred after the selected log truncation/recovery time, i.e., each record in the data sets is examined and potentially changed in order to make it look like all IMS systems stopped at the truncation time. Preferably, all logging related records are adjusted to reflect the output log data sets created in step 58. Further, all records are adjusted to present the appearance that all IMS activity ceased at the recovery time stamp. In addition, all databases and AREAs are suitably marked as needing recovery, all logging related records and ALLOC records are suitably closed, and BACKOUT records for all in-flight and in-doubt MS units of recovery are built, with all databases impacted by in-flight and in-doubt IMS units of recovery marked as needing backout.

With the present invention, all of the recovery functionality is efficiently performed in a single job step. Since multiple IMS subsystems could be executing during the selected recovery time due to IMS data sharing resulting in multiple IMS log data stream requiring processing, the log processing activities are preferably performed as separate MVS sub-tasks, as is well appreciated by those skilled in the art, in order to reduce overall elapsed execution time. Further, through utilization of software threads, the elapsed time required for analyzing the selected log data sets and creating the truncated output log data sets is substantially reduced.

Accordingly, many modifications may be made by one of ordinary skill without departing from the spirit and scope of the present invention, the scope of which is defined by the following claims.

What is claimed is:

1. A data processing system with improved database recovery functionality, the data processing system comprising:

a plurality of multitasking devices, the plurality of multitasking devices each running under an operating system providing database control operations;

memory means coupled to the plurality of multitasking devices for executing tasks of the multitasking devices; and recovery manager means for providing database recovery processing of input and output data sets in the plurality of multitasking devices through the operating system to any desired recovery time, wherein recovery occurs without requiring database quiescing.

2. The system of claim 1 wherein the recovery manager means further analyzes control statement inputs to determine options for conditioning the input and output data sets for recovery, including a desired recovery time.

3. The system of claim 2 wherein the recovery manager means further determines open batch logs, archiving gaps, and logs created by a batch backout utility from a recovery control data set.

4. The system of claim 3 wherein the recovery manager means further determines a latest valid recovery time from the recovery control data set, and validates the desired recovery time in correspondence with the latest valid recovery time.

5. The system of claim 4 wherein the recovery manager means further determines active log data sets in log data streams during the desired recovery time.

6. The system of claim 5 wherein the recovery manager means further creates a first plurality of threads to analyze contents of log data sets from multiple and concurrent log data streams and to copy the contents to intermediate files.

7. The system of claim 6 wherein the recovery manager means revalidates and adjusts the desired recovery time based on the log data streams.

8. The system of claim 7 wherein the recovery manager means further creates a second plurality of threads to dynamically allocate output log data sets, copy log data from the intermediate files to the output log data sets, truncate the copied log data at the desired recovery time, and analyze the copied log data to determine in-flight and in-doubt units of recovery.

9. The system of claim 8 wherein the recovery manager means further reports in-flight and in-doubt units of recovery.

10. The system of claim 9 wherein the recovery manager means further processes the recovery control data set to adjust logging records to reflect the output log data sets, adjust data records to give the appearance that activity ceased at the desired recovery time, mark a need for database recovery, close logging records, build backout records for in-flight and in-doubt units of recovery, and mark databases affected by in-flight and in-doubt units of recovery as needing backout.

* * * * *